US011572130B1

(12) United States Patent
Huth

(10) Patent No.: US 11,572,130 B1
(45) Date of Patent: Feb. 7, 2023

(54) BIKE PEDAL ATTACHMENT SYSTEM

(71) Applicant: Michael V. Huth, Miramar, FL (US)

(72) Inventor: Michael V. Huth, Miramar, FL (US)

( * ) Notice: Subject to any disclaimer, the term of this patent is extended or adjusted under 35 U.S.C. 154(b) by 69 days.

(21) Appl. No.: 17/205,902

(22) Filed: Mar. 18, 2021

(51) Int. Cl.
B62M 3/14 (2006.01)
B62M 3/16 (2006.01)

(52) U.S. Cl.
CPC ............... B62M 3/14 (2013.01); B62M 3/16 (2013.01)

(58) Field of Classification Search
CPC .................................. B62M 3/14; B62M 3/16
USPC ......................................................... 280/249
See application file for complete search history.

(56) References Cited

U.S. PATENT DOCUMENTS

| 4,733,880 A * | 3/1988 | Wilhelm, III | ............ | B62M 1/12 280/240 |
| 5,002,298 A | 3/1991 | Motto | | |
| 5,511,810 A | 4/1996 | Tong | | |
| 6,032,970 A * | 3/2000 | Porter | ...................... | B62M 1/16 280/247 |
| 8,181,977 B1 * | 5/2012 | Bartlett | .................... | B62M 1/12 280/247 |

* cited by examiner

Primary Examiner — Jacob B Meyer
Assistant Examiner — Felicia L. Brittman
(74) Attorney, Agent, or Firm — Sanchelima & Associates, P.A.; Christian Sanchelima; Jesus Sanchelima

(57) ABSTRACT

A bicycle pedal attachment includes an elongated pole, similar to hiking pole, which is removably attachable to the pedals of a bicycle or tricycle. The bike pedal attachment includes a bracket assembly and a pole assembly. The bracket assembly includes a support bracket attachable to a bicycle pedal. The distal end of the support bracket includes a ball joint extend therefrom. The ball joint then serves as an operative connection point for the pole assembly. The pole assembly includes an elongated telescopic pole with a locking mechanism at a distal end. The locking mechanism includes a slidable locking member that engages with the ball joint thereon. Once assembled thereon, the bike pedal attachment allows a user to use their hands eases the cycling motion performed on the bicycle.

11 Claims, 5 Drawing Sheets

BIKE PEDAL ATTACHMENT SYSTEM

BACKGROUND OF THE INVENTION

1. Field of the Invention

The present invention relates to a bike pedal attachment and, more particularly, to a bike pedal attachment system that includes an auxiliary assist device comprising an elongated pole for easing the pedaling motion of a bicycle.

2. Description of the Related Art

Several designs for a bike pedal attachment have been designed in the past. None of them, however, include an auxiliary assist device for a bicycle pedal attachment including an elongated pole, similar to hiking pole, which is removably attachable to the pedals of a bicycle or tricycle. The bike pedal attachment includes a bracket assembly and a pole assembly. The bracket assembly includes a support bracket attachable to a bicycle pedal. The distal end of the support bracket includes a ball joint extend therefrom. The ball joint then serves as an operative connection point for the pole assembly. The pole assembly includes an elongated telescopic pole with a locking mechanism at a distal end. The locking mechanism includes a slidable locking member that engages with the ball joint thereon. Once assembled thereon, the bike pedal attachment allows a user to use their hands eases the cycling motion performed on the bicycle.

Applicant believes that a related reference corresponds to U.S. Pat. No. 5,511,810 issued for a hand driving device for a bicycle. Applicant believes that another related reference corresponds to U.S. Pat. No. 5,002,298 issued for a hand assisted propulsion apparatus for a bicycle. However, the cited references differ from the present invention because they fail to disclose the slidable locking configuration of the pole assembly onto the ball joint of the bracket assembly.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a bicycle pedal attachment system to allow for a rider to use their arms in order to ease the pedaling motion performed by their legs on a bicycle.

It is another object of this invention to provide a bicycle pedal attachment that enables the elderly and the disabled to operate a bicycle using their arms to operate an elongated pole.

It is still another object of the present invention to provide a bicycle pedal attachment that allows for a rider to work out their upper body while simultaneously riding a bicycle.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
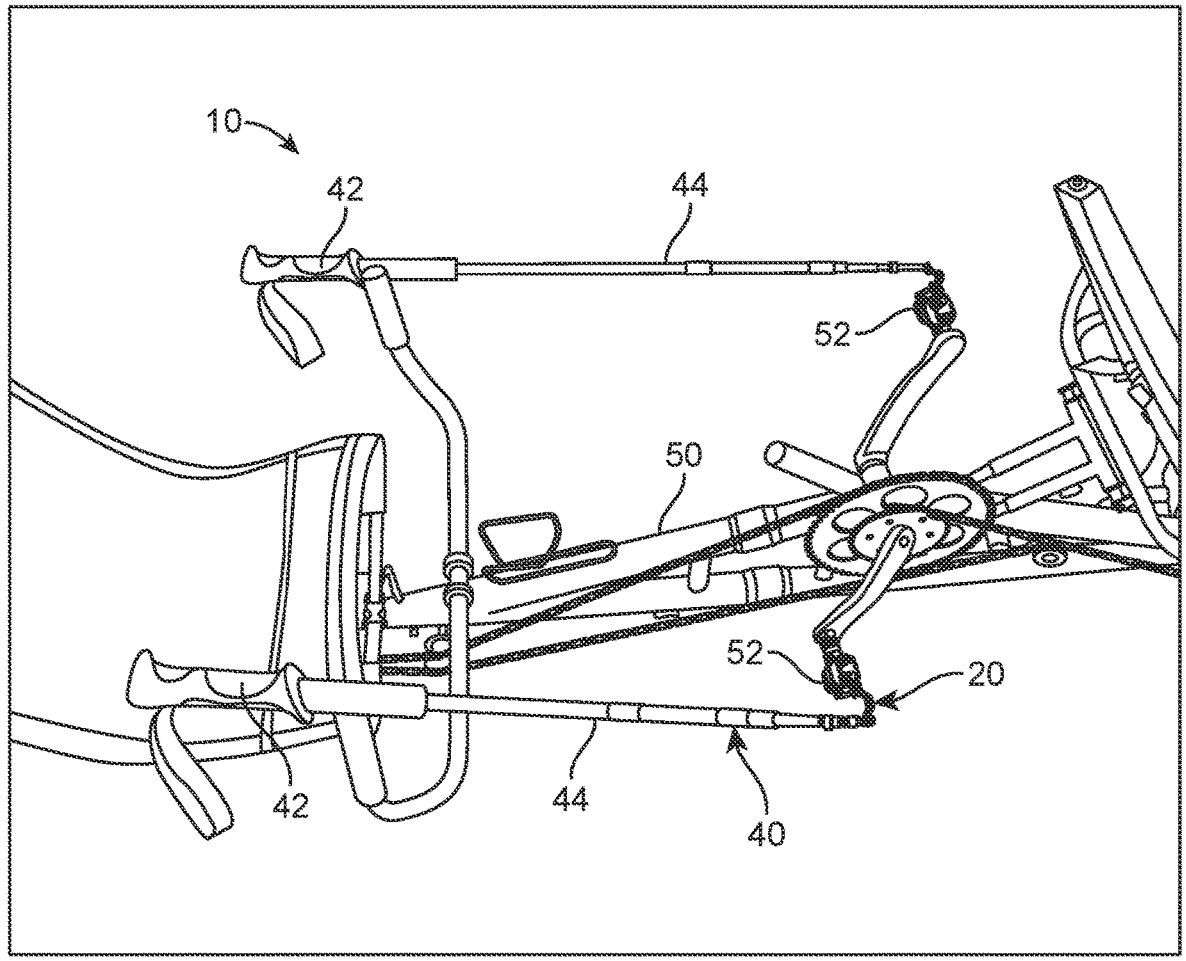
FIG. 1 represents an isometric view depicting bicycle pedal attachment system 10 in an assembled configuration onto bicycle 50 in accordance with an embodiment of the present invention.

Referring now to the drawings, where the present invention is generally referred to with numeral 10, it can be observed a bike pedal attachment system 10 which basically includes a bracket assembly 20 and a pole assembly 40.

Figure 2:
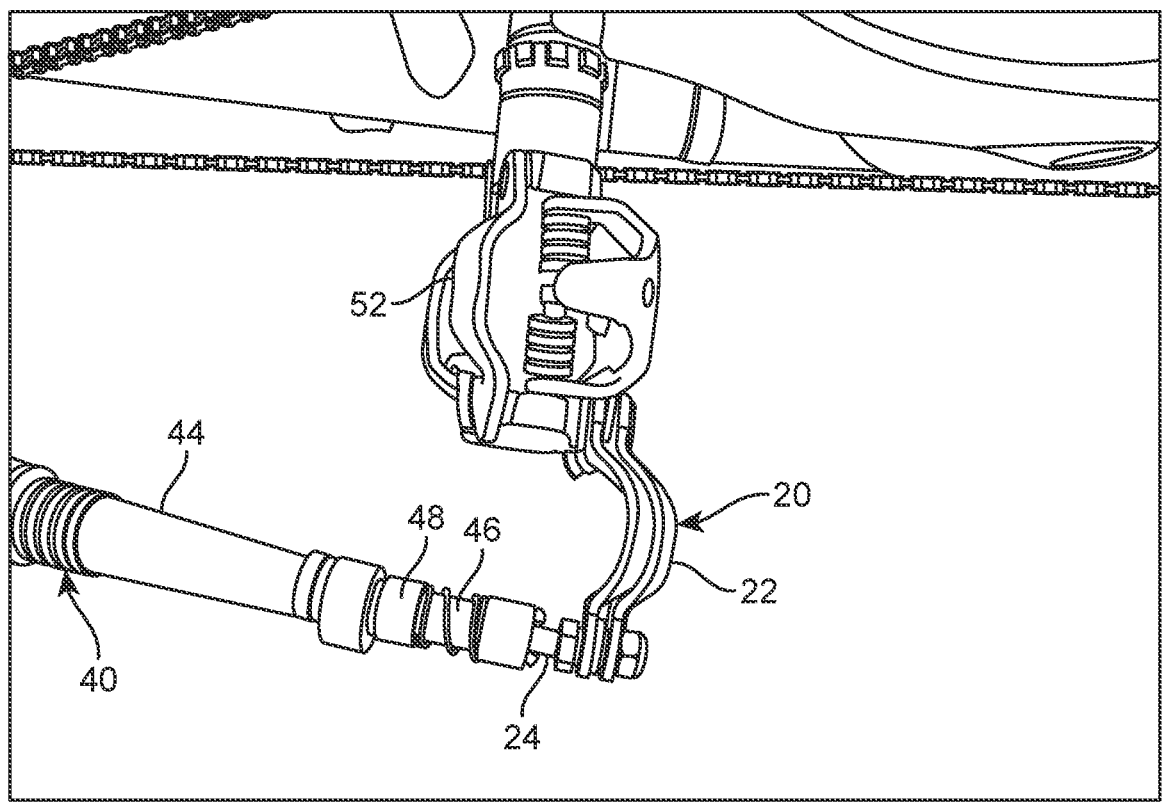
FIG. 2 shows an enlarged isometric view depicting bracket assembly 20 engaged with pole assembly 40 in accordance with an embodiment of the present invention.

Bracket assembly 20 includes a support bracket 22 attachable to a bicycle pedal 52 of a bicycle 50. In one embodiment, support bracket 22 may be made of a metal material and be fashioned into any suitable shape. Support bracket 22 depicted in FIG. 2 depicts two support brackets being fastened together to provide additional support. However, it should be understood that the present system 10 may function with one bracket 22 mounted onto pedal 52. In one implementation, support bracket 22 is secured onto pedal 52 via traditional fasting members or welding. It should be understood that a bicycle typically comes with two bike pedals for each foot of a rider and therefore bicycle 50 should include at least one support bracket 22 mounted onto at least one of pedal 52.

In the present embodiment, ball joint 24 is disposed at a distal end of support bracket 22. As observed in FIG. 3, ball joint 24 may extend perpendicularly from support bracket 22. Ball joint 24 comprises of a ball portion 24A and a neck portion 24B. Neck portion 24B is provided as a cylindrical member which perpendicularly extends from support bracket 22. The ball portion 24A is then mounted to a topmost end of neck portion 24B. In the present implementation, ball portion 24A is provided as a spherical member. As observed in FIGS. 3 and 4, ball joint 24 may be secured onto support bracket 22 via nuts 26 to threadably engage ball joint 24. However, it can be appreciated that alternate embodiments of the present invention may feature ball joint 24 being welded directly onto support bracket 22.

Pole assembly 40 includes a handle 42 being operatively engaged to a top operative end of an elongated pole 44. Elongated pole 44 may have the resemblance of a hiking pole. It is desirable for elongated pole 44 to have a suitable length such that a rider may comfortably operate pole assembly 40 when mounted onto bicycle 50. Additionally, handle 42 may be provided as a cushioned handle in order to provide comfort to a rider during operation of pole assembly 40. It should be understood that the present system may implement at least one elongated pole 44 that is provided for the at least one support bracket 22 mounted to the bicycle.

Figure 3:
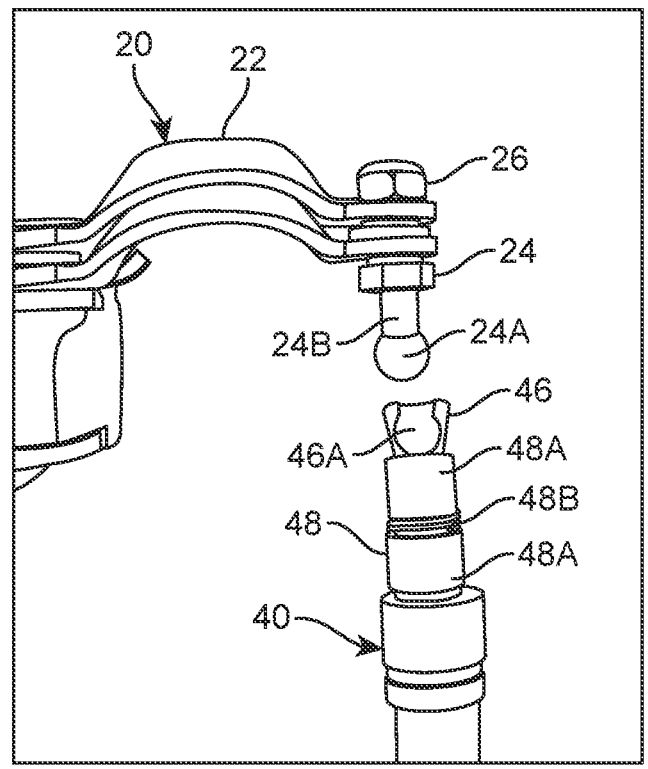
FIG. 3 illustrates an isometric top view depicting pole assembly 40 in a receiving configuration to then be mounted with bracket assembly 20 in accordance with an embodiment of the present invention.
Figure 4:
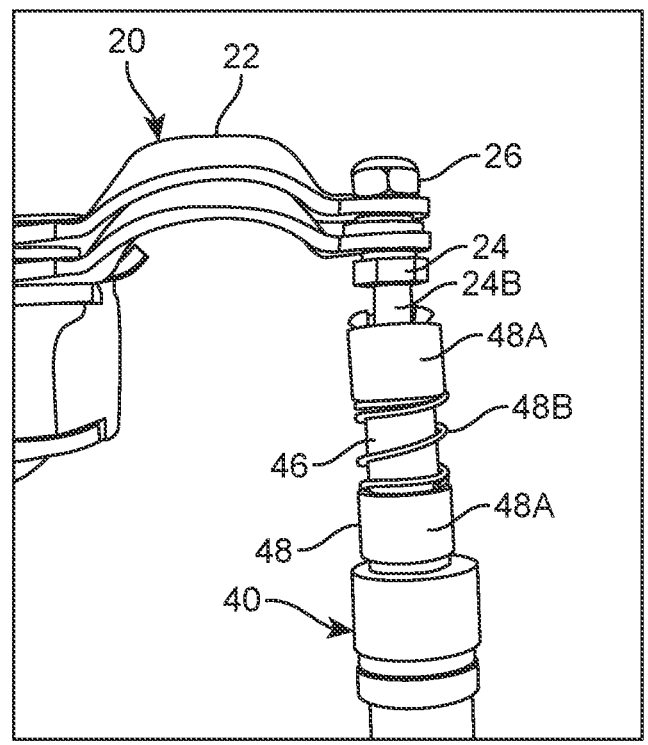
FIG. 4 is a representation of another isometric top view depicting pole assembly 40 in an interlocking configuration with bracket assembly 20 in accordance with an embodiment of the present invention.
Figure 5:
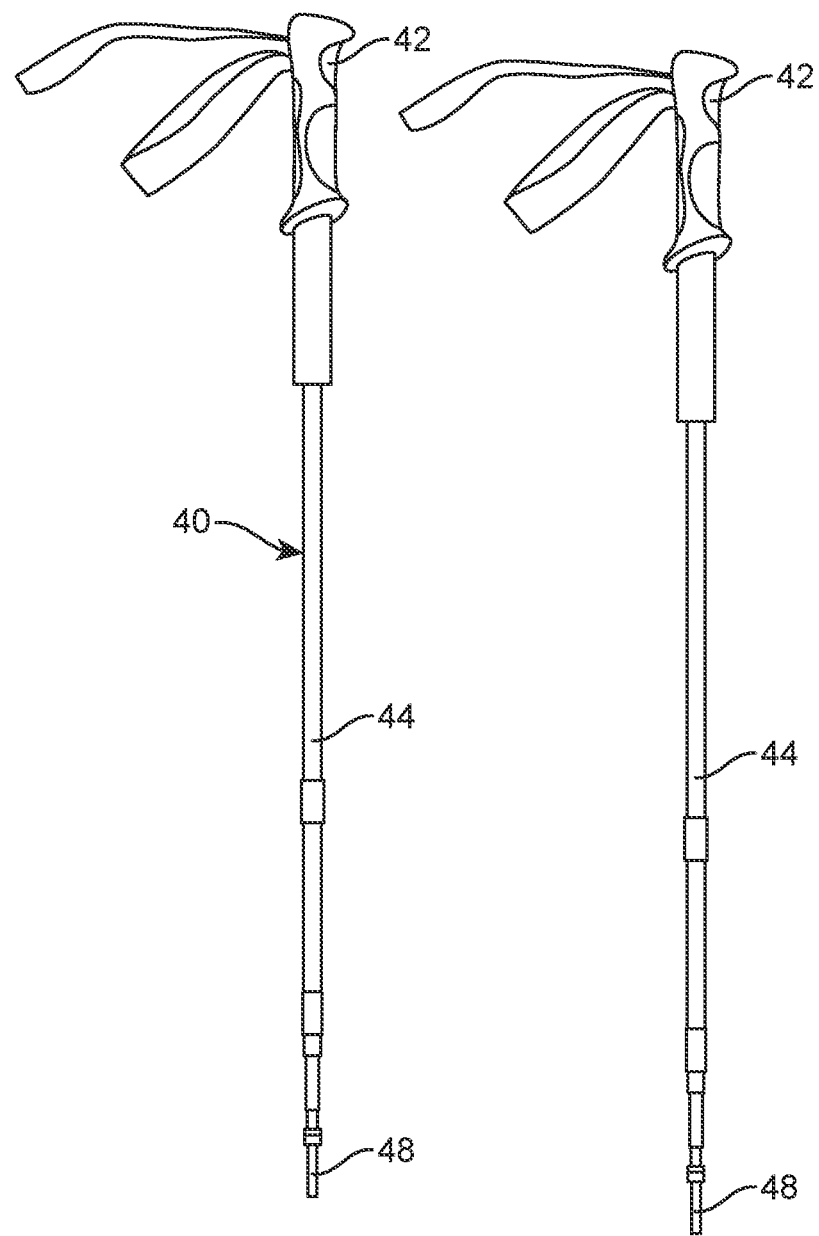
FIG. 5 shows an isometric view of pole assembly 40 in accordance with an embodiment of the present invention.
Figure 6:
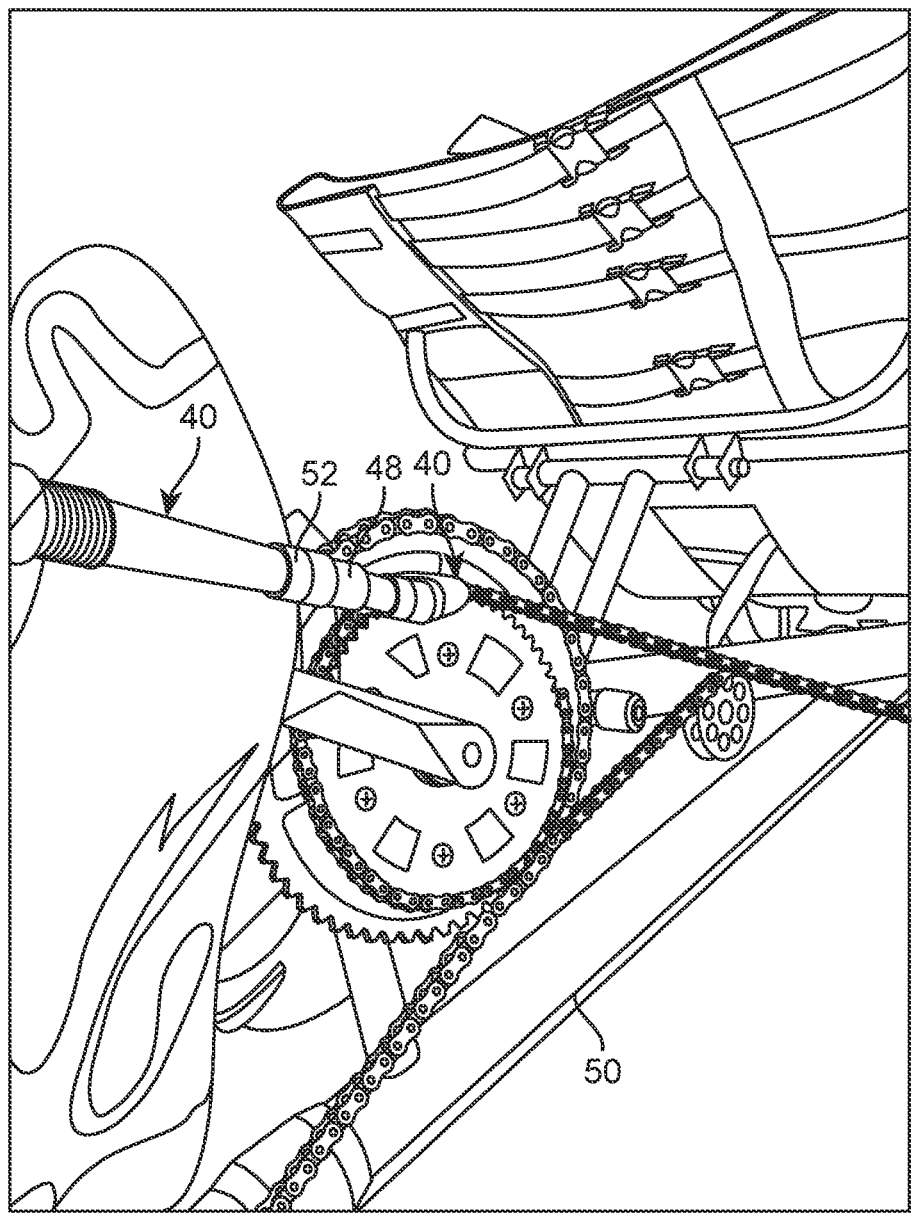
FIG. 6 depicts an isometric view depicting bracket assembly 20 engaged with pole assembly 40 in accordance with an embodiment of the present invention.

A bottom operative end of elongated pole 44 includes a joint receiver 46 and locking sleeve 48 disposed thereon. FIGS. 3 and 4 provide the optimal view for joint receiver 46 and locking sleeve 48. In the present embodiment, locking sleeve 48 is wrapped over joint receiver 46 to form a locking mechanism having a receiving position and a locking position.

Joint receiver 46 is a cylindrical member 46 with a cavity 46A formed at an operative end thereof. In the present embodiment, the cavity of joint receiver 46 must cooperate with ball joint 24 to be comfortably received therein. Locking sleeve 48 comprises of support members 48A which may be provided as ring members which are engaged around joint receiver 46. A spring 48B is then positioned between support members 48A which also wraps around the outer surface of joint receiver 46.

The receiving position is observed in FIG. 3 of the provided drawings. It can be observed that in the receiving position, support members 48A are actuated in order to compress spring 48B in order to reveal the cavity 46A of joint receiver 46. In the receiving position, a user may then engage ball joint 24 with joint receiver 46. The locking position is observed in FIG. 4 of the drawings. It can be observed that support members 48A are then released in order to allow spring 48A to decompress.

As a result, support member 48A is then urged over ball joint 24 in order to substantially cover both the ball portion 24A and the neck portion 24B. Pole assembly 40 then remains comfortable and safely engaged onto bracket assembly 20 for safe operation.

In the present embodiment, pole assembly 40 is engaged with bracket assembly 20 as observed in FIG. 1. A user may then utilize pole assembly 40 to provide additional pedaling support when operating bicycle 50. This allows for elderly and disabled users to comfortable operate a bicycle. Additionally, using the arms to operate pole assembly 40 will provide a rider with additional arm and chest workouts when operating bicycle 50. It should be understood that bike pedal attachment system 10 may be attached to any embodiment of cycling vehicle and is not limited to being any particular form of bicycle. Some embodiments, as observed in FIG. 1 may include a pole support which holds the pole assembly 40 in place for the vehicle.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A bike pedal attachment system, comprising:
   a) a bracket assembly including at least one support bracket mounted onto a pedal, said at least one support bracket having a joint extending outwardly from a distal end; and
   b) a pole assembly including at least one elongated pole having a joint receiver and a locking sleeve at an operative end thereof, said locking sleeve being wrapped around said joint receiver, wherein said joint is selectively engaged with said joint receiver, said locking sleeve urged to cover said joint and said joint receiver to form a locking position, said joint is a ball joint having a ball portion and a neck portion, said locking sleeve includes support members and a spring.

2. The bike pedal attachment system of claim 1 wherein said joint is mounted perpendicular to the at least one support bracket.

3. The bike pedal attachment system of claim 1 wherein said ball portion is a spherical shape and said neck portion is a cylindrical member, said ball portion being mounted to a distal most end of said neck portion.

4. The bike pedal attachment system of claim 1 wherein said elongated pole includes a handle mounted to an opposing operative end thereof.

5. The bike pedal attachment of system claim 1 wherein said joint is mounted to said pedal with nut fasteners.

6. The bike pedal attachment system of claim 1 wherein said pedal is a bicycle pedal that is part of a bicycle.

7. The bike pedal attachment system of claim 6 wherein said bicycle further includes a pole support mounted thereon.

8. The bike pedal attachment system of claim 1 wherein said joint receiver includes a cavity formed at a topmost end which cooperates with a shape of said joint.

9. The bike pedal attachment system of claim 1 wherein said support members are ring members positioned around said joint receiver, said spring being positioned between said support members and wrapped around said joint receiver.

10. A bike pedal attachment system, comprising:
    a) a bicycle including a bike pedal;
    b) a bracket assembly including at least one support bracket mounted onto the bike pedal, said at least one support bracket having a joint extending outwardly from a distal end, wherein said joint is mounted perpendicular to the at least one support bracket, wherein said joint is a ball joint having a ball portion and a neck portion, wherein said ball portion is a spherical shape and said neck portion is a cylindrical member, said ball portion being mounted to a distal most end of said neck portion, wherein said joint is mounted to said pedal with nut fasteners; and
    c) a pole assembly including at least one elongated pole having a joint receiver and a locking sleeve at an operative end thereof, wherein said elongated pole includes a handle mounted to an opposing operative end thereof, said locking sleeve being wrapped around said joint receiver, wherein said joint is selectively engaged with said joint receiver, wherein said joint receiver includes a cavity formed at a topmost end which cooperates with a shape of said joint, said locking sleeve urged to cover said joint and said joint receiver to form a locking position, wherein said locking sleeve includes support members and a spring, wherein said support members are ring members positioned around said joint receiver, said spring being positioned between said support members and wrapped around said joint receiver.

11. A bike pedal attachment system, consisting of:
    a) a bicycle including two bike pedals, said bicycle further including a U-shaped pole support structure;
    b) a bracket assembly including two support brackets mounted onto the two bike pedals, said two support brackets each having a joint extending outwardly from a distal end, wherein said joint is mounted perpendicular to the each of the support brackets, wherein said joint is a ball joint having a ball portion and a neck portion, wherein said ball portion is a spherical shape and said neck portion is a cylindrical member, said ball portion being mounted to a distal most end of said neck portion, wherein said joint is mounted to said two bike pedals with nut fasteners;

c) a pole assembly including two elongated poles supported on the U-shaped pole support structure, said two elongated poles each having a joint receiver and a locking sleeve at an operative end thereof, wherein said two elongated poles each also include a handle mounted to an opposing operative end thereof, said locking sleeve being wrapped around said joint receiver, wherein said joint is selectively engaged with said joint receiver, wherein said joint receiver includes a cavity formed at a topmost end which cooperates with a shape of said joint, said locking sleeve urged to cover said joint and said joint receiver to form a locking position, wherein said locking sleeve includes support members and a spring, wherein said support members are ring members positioned around said joint receiver, said spring being positioned between said support members and wrapped around said joint receiver.

* * * * *